(12) United States Patent
McCloskey et al.

(10) Patent No.: US 7,132,498 B2
(45) Date of Patent: Nov. 7, 2006

(54) PROCESS TO MAKE POLYCARBONATE FROM BISMETHYLSALICYLCARBONATE (BMSC)

(75) Inventors: Patrick Joseph McCloskey, Watervliet, NY (US); Norberto Silvi, Clifton Park, NY (US); Alberto Nisoli, Niskayuna, NY (US); Mark Giammattei, Selkirk, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/951,574

(22) Filed: Sep. 27, 2004

(65) Prior Publication Data

US 2006/0069228 A1    Mar. 30, 2006

(51) Int. Cl.
   *C08G 63/00*    (2006.01)
(52) U.S. Cl. .................. 528/196; 264/176.1; 264/219; 422/131; 528/198
(58) Field of Classification Search ............. 264/176.1, 264/219, 1, 21; 422/131; 528/196, 198
   See application file for complete search history.

(56) References Cited

U.S. PATENT DOCUMENTS

| | | | |
|---|---|---|---|
| 3,863,905 A * | 2/1975 | Maxwell | 425/208 |
| 4,323,668 A | 4/1982 | Brunelle | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 * | 7/2002 | McCloskey et al. | 528/196 |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 * | 1/2003 | Silvi et al. | 528/198 |
| 6,518,391 B1 | 2/2003 | McCloskey et al. | |
| 6,525,163 B1 | 2/2003 | Brack et al. | |
| 6,548,623 B1 | 4/2003 | Brunelle et al. | |
| 6,590,068 B1 | 7/2003 | Brack et al. | |
| 6,600,004 B1 | 7/2003 | McCloskey et al. | |
| 6,653,434 B1 | 11/2003 | Brack et al. | |
| 6,706,846 B1 | 3/2004 | Brack et al. | |
| 6,710,156 B1 | 3/2004 | Whitney et al. | |
| 6,723,823 B1 | 4/2004 | McCloskey et al. | |
| 6,734,277 B1 | 5/2004 | Brack et al. | |
| 6,747,119 B1 * | 6/2004 | Brack et al. | 528/198 |
| 2002/0132957 A1 | 9/2002 | Brack et al. | |
| 2003/0236384 A1 | 12/2003 | Silvi et al. | |
| 2004/0068086 A1 | 4/2004 | Day et al. | |
| 2004/0087756 A1 | 5/2004 | Ramesh et al. | |

FOREIGN PATENT DOCUMENTS

| | | |
|---|---|---|
| JP | 5009282 A2 | 1/1993 |
| JP | 10-101786 A2 | 4/1998 |
| JP | 10-101787 A2 | 4/1998 |
| JP | 11-302228 | 11/1999 |
| JP | 2000129112 | 5/2000 |
| JP | 2002-309015 A2 | 10/2002 |
| WO | WO 03/040208 A1 | 5/2003 |
| WO | WO 03/106149 A1 | 12/2003 |

* cited by examiner

*Primary Examiner*—Terressa Boykin
(74) *Attorney, Agent, or Firm*—Marina Larson & Associates, LLC

(57) ABSTRACT

The present invention relates to a method of preparing polycarbonate comprising the steps of: (i) introducing to an extruder through a feed port a plurality of reaction components comprising a polycarbonate oligomer, an activated carbonate residue, and a transesterification catalyst, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port; and (ii) extruding the reaction components at one or more temperatures in a range between 100° C. and 400° C., wherein during the extrusion of the reaction components, activated carbonate residue is removed through the first back vent port, thereby preparing a polycarbonate.

61 Claims, 1 Drawing Sheet

PROCESS TO MAKE POLYCARBONATE FROM BISMETHYLSALICYLCARBONATE (BMSC)

BACKGROUND OF THE INVENTION

This invention relates to a method of preparing polycarbonate. More particularly the method relates to a method whereby a solution comprising a solvent and an oligomeric polycarbonate is introduced into a devolatilizing extruder wherein the oligomeric polycarbonate is converted into high molecular weight polycarbonate while simultaneously removing the solvent. More particularly, the instant invention relates to the formation under mild conditions of polycarbonates having extremely low levels of Fries rearrangement products, a high level of endcapping and low levels of residual solvent.

Polycarbonates, such as bisphenol A polycarbonate, are typically prepared either by interfacial or melt polymerization methods. The reaction of a bisphenol such as bisphenol A (BPA) with phosgene in the presence of water, a solvent such as methylene chloride, an acid acceptor such as sodium hydroxide and a phase transfer catalyst such as triethylamine is typical of the interfacial methodology. The reaction of bisphenol A with a source of carbonate units such as diphenyl carbonate at high temperature in the presence of a catalyst such as sodium hydroxide is typical of currently employed melt polymerization methods. Each method is practiced on a large scale commercially and each presents significant drawbacks.

The interfacial method for making polycarbonate has several inherent disadvantages. First it is a disadvantage to operate a process which requires phosgene as a reactant due to obvious safety concerns. Second it is a disadvantage to operate a process which requires using large amounts of an organic solvent because expensive precautions must be taken to guard against any adverse environmental impact. Third, the interfacial method requires a relatively large amount of equipment and capital investment. Fourth, the polycarbonate produced by the interfacial process is prone to having inconsistent color, higher levels of particulates, and higher chloride content, which can cause corrosion.

The melt method, although obviating the need for phosgene or a solvent such as methylene chloride requires high temperatures and relatively long reaction times. As a result, by-products may be formed at high temperature, such as the products arising by Fries rearrangement of carbonate units along the growing polymer chains. Fries rearrangement gives rise to undesired and uncontrolled polymer branching which may negatively impact the polymer's flow properties and performance. The melt method further requires the use of complex processing equipment capable of operation at high temperature and low pressure, and capable of efficient agitation of the highly viscous polymer melt during the relatively long reaction times required to achieve high molecular weight.

Some years ago, it was reported in U.S. Pat. No. 4,323, 668 that polycarbonate could be formed under relatively mild conditions by reacting a bisphenol such as BPA with the diaryl carbonate formed by reaction phosgene with methyl salicylate. The method used relatively high levels of transesterification catalysts such as lithium stearate in order to achieve high molecular weight polycarbonate. High catalyst loadings are particularly undesirable in melt polycarbonate reactions since the catalyst remains in the product polycarbonate following the reaction. The presence of a transesterification catalyst in the polycarbonate may shorten the useful life span of articles made therefrom by promoting increased water absorption, polymer degradation at high temperatures and discoloration.

In U.S. Pat. No. 6,420,512, extrusion of a mixture of an ester-substituted diaryl carbonate, such as bis-methyl salicyl carbonate, a dihydroxy aromatic compound, such as bisphenol A, and a transesterification catalyst, such as tetrabutylphosphonium acetate (TBPA), afforded high molecular weight polycarbonate. The extruder employed was equipped with one or more vacuum vents to remove by-product ester-substituted phenol. Similarly, a precursor polycarbonate having ester-substituted phenoxy endgroups, for example methyl salicyl endgroups, when subjected to extrusion afforded a polycarbonate having a significantly increased molecular weight relative to the precursor polycarbonate. The reaction to form a higher molecular weight polycarbonate may be catalyzed by residual transesterification catalyst present in the precursor polycarbonate, or by a combination of any residual catalyst and an additional catalyst such as TBPA introduced in the extrusion step. Fries rearrangement products were not observed in the product polycarbonates.

Although the methods described in U.S. Pat. No. 6,420, 512 represent significant enhancements in the preparation of polycarbonate relative to older methods, additional improvements are needed. For example, it would be highly desirable to increase the throughput rate of starting materials through the extruder in order to achieve greater efficiency without observing the entrainment of the feed and polycarbonate at the vent ports of the extruder. In addition, it would be highly desirable to avoid having to isolate a precursor polycarbonate having ester-substituted phenoxy endgroups prior to its extrusion to afford a higher molecular weight polycarbonate.

SUMMARY OF THE INVENTION

Applicants have discovered a superior process for the production of polycarbonate using an ester-substituted carbonate. In accordance with an embodiment of the present invention polycarbonate is prepared by the method comprises the steps of:

(i) introducing to an extruder through a feed port a plurality of reaction components comprising a polycarbonate oligomer, an activated carbonate residue, and a transesterification catalyst, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and (ii) extruding the reaction components at one or more temperatures in a range between 100° C. and 400° C., wherein during the extrusion of the reaction components, activated carbonate residue is removed through the first back vent port, thereby preparing a polycarbonate.

The present invention is an improvement over the prior art. It has been found that the process of the present invention allows for superior polycarbonate production using a back vented extruder while minimizing residence time and the number of barrels required in typical extrusion methods. Further it has been found that a back vent port on an extruder may be operated under conditions to remove activated carbonate residue without the entrainment of oligomer at the vent port even in the circumstance that the resistance to flow of the reaction components from the feed port to the back vent port is less than or equal to the resistance to flow of the reaction components from the feed port to the polycarbonate exit port.

DETAILED DESCRIPTION OF THE INVENTION

Figure 1:
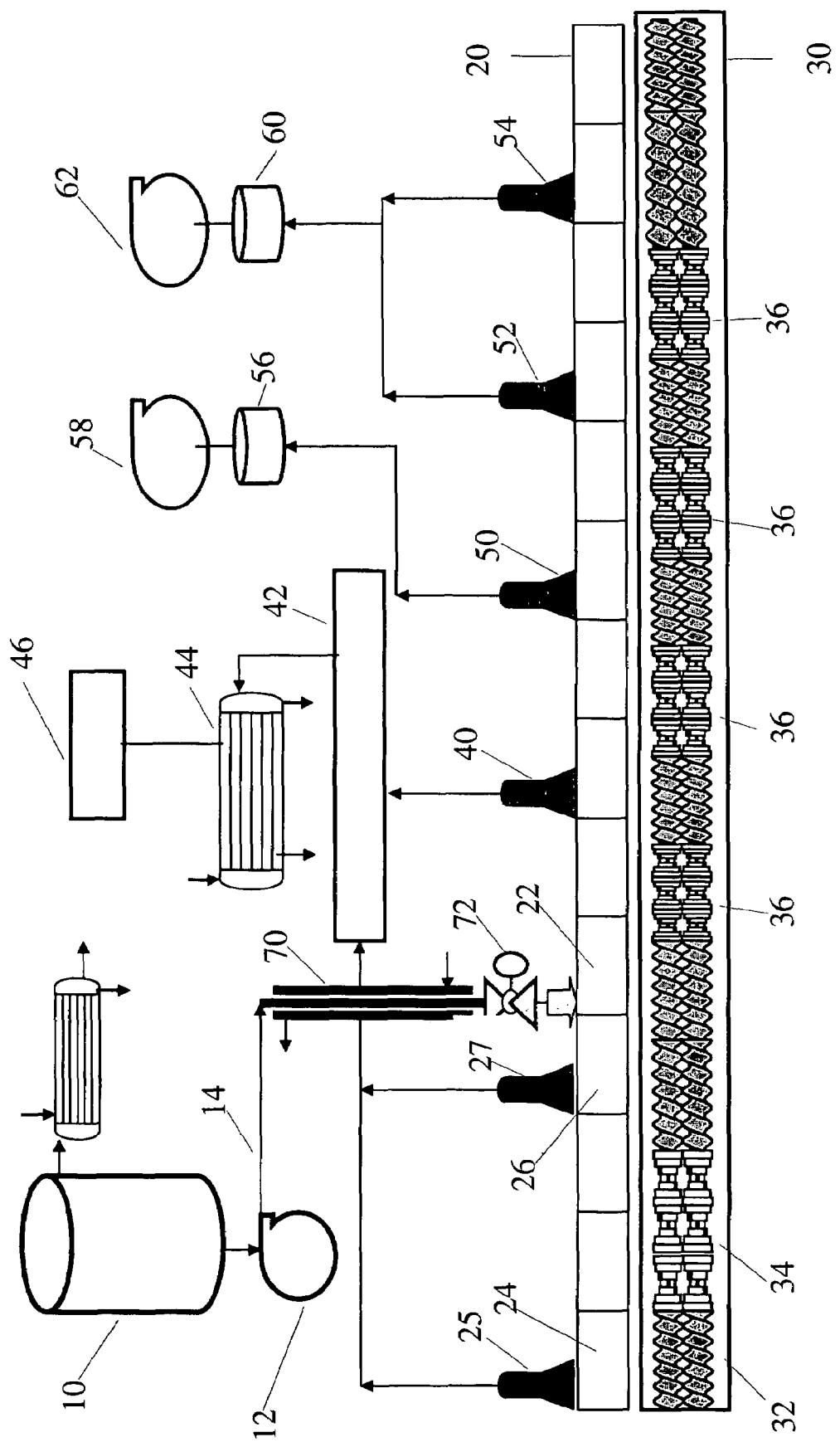
FIG. 1: shows an apparatus for practicing the invention.

The present invention may be understood more readily by reference to the following detailed description of preferred embodiments of the invention and the examples included therein. In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the terms "polycarbonate oligomer" and "oligomeric polycarbonate" are synonymous and refer to a polycarbonate oligomer having a number average molecular weight of less than 7000 Daltons and includes oligomeric polycarbonates comprising polycarbonate repeat units derived from one or more dihydroxy aromatic compounds.

As used herein, when describing an oligomeric polycarbonate, the expression "polycarbonate repeat units derived from at least one dihydroxy compound" means a repeat unit incorporated into an oligomeric polycarbonate by reaction of a dihydroxy compound with a source of carbonyl units, for example the reaction of bisphenol A with bis(methyl salicyl) carbonate.

As used herein, the term "high molecular weight polycarbonate" means polycarbonate having a number average molecular weight, $M_n$, of 8000 Daltons or more.

As used herein, the term "solvent" can refer to a single solvent or a mixture of solvents.

As used herein, the term "solution comprising a solvent and an oligomeric polycarbonate" refers to a liquid oligomeric polycarbonate comprising at least 5 percent by weight solvent.

As used herein, the term "melt polycarbonate" refers to a polycarbonate made by the transesterification of a diaryl carbonate with a dihydroxy compound.

As used in the examples section of the specification the term "TLTM" refers to values that were too low to measure. "BPA" is herein defined as bisphenol A or 2,2-bis(4-hydroxyphenyl)propane.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

The terms "double screw extruder" and "twin screw extruder" are used interchangeably herein.

As used herein the term "monofunctional phenol" means a phenol comprising a single reactive hydroxy group.

The terms "vent port" and "vent" are used interchangeably herein.

"Polycarbonate" refers to polycarbonates incorporating repeat units derived from at least one dihydroxy aromatic compound and includes copolyestercarbonates, for example a polycarbonate comprising repeat units derived from resorcinol, bisphenol A, and dodecandioic acid. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

Numerical values in the specification and claims of this application reflect average values. Furthermore, the numerical values should be understood to include numerical values which are the same when reduced to the same number of significant figures and numerical values which differ from the stated value by less than the experimental error of the measurement technique used in the present application to determine the value.

U.S. patent application Ser. No. 10/389,009 (pub. No. US 2003/0236384), herein incorporated by reference, shows a back vented extruder in FIG. 3. However, US 2003/0236384 discloses the use of an active element, (i.e. a kneading element), that is placed between the back vent and the feed port of the extruder to increase the resistance of flow of the reaction components to the back vent to reduce or eliminate the entrainment of oligomer/polymer in the back vent. It has herein been found that no such active element is required to prevent the entrainment of the oligomer/polymer in the back vent. Thus, the extruder of the present invention has a back vent wherein the resistance to flow of the reaction components from the feed port to the back vent port is less than or equal to the resistance to flow of the reaction components from the feed port to the polycarbonate exit port.

The method of the invention effects both the conversion of the oligomeric polycarbonate to a product polycarbonate having higher molecular weight, and a separation of the solvent initially present in the solution of the oligomeric polycarbonate from the product polycarbonate. Additionally, the method provides for the removal of other volatile materials which may be present in the initial solution of oligomeric polycarbonate, or formed as by-products as the oligomeric polycarbonate is transformed in the extruder to the product polycarbonate. One embodiment of the present invention provides a method for preparing polycarbonate comprising the steps of:

(i) introducing to an extruder through a feed port a plurality of reaction components comprising a polycarbonate oligomer, an activated carbonate residue, and a transesterification catalyst, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and (ii) extruding the reaction components at one or more temperatures in a range between 100° C. and 400° C., wherein during the extrusion of the reaction components, activated carbonate residue is removed through the first back vent port.

The Activated Diaryl Carbonate:

The carbonate is preferably derived from an activated dicarbonate or a mixture of an activated carbonate with diphenyl carbonate. A preferred activated carbonate of the present invention is an activated diarylcarbonate such as bismethylsalicylcarbonate (BMSC). However, as used herein the term "activated carbonate" is defined as a diarylcarbonate which is more reactive than diphenylcarbonate toward transesterification reactions. Such activated carbonates are of the general formula:

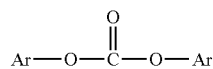

wherein Ar is a substituted aromatic radical having 6 to 30 carbon atoms. The preferred activated carbonates have the more specific general formula:

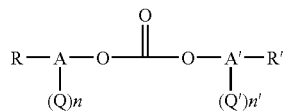

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein n+n' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number, type, and location of the R and R' substituents on the aromatic ring are not limited unless they deactivate the carbonate and lead to a carbonate which is less reactive than diphenylcarbonate.

Non-limiting examples of activating groups Q and Q' are: alkoxycarbonyl groups, halogens, nitro groups, amide groups, sulfone groups, sulfoxide groups, or imine groups with structures indicated below:

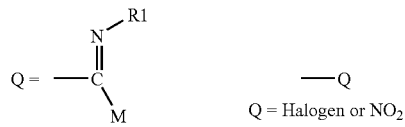

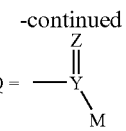

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures, where the substitution number and type on A and A' are different, are also possible to employ in the current invention. A preferred structure for an activated carbonate is an ester-substituted diarylcarbonate having the structure:

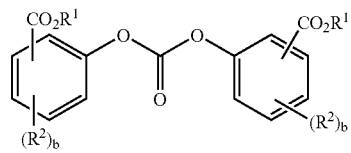

wherein $R^1$ is independently at each occurrence a $C_1$–$C_{20}$ alkyl radical, $C_4$–$C_{20}$ cycloalkyl radical, or $C_4$–$C_{20}$ aromatic radical; $R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfonyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and b is independently at each occurrence an integer 0–4. At least one of the substituents $CO_2R^1$ is preferably attached in an ortho position relative to the carbonate group.

Examples of preferred ester-substituted diarylcarbonates include but are not limited to bis(methylsalicyl)carbonate (CAS Registry No.. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. Typically BMSC is preferred for use in melt polycarbonate synthesis due to its lower molecular weight and higher vapor pressure.

One method for determining whether a certain diarylcarbonate is activated or is not activated is to carry out a model transesterification reaction between the certain diarylcarbonate with a phenol such as p-(1,1,3,3-tetramethyl)butylphenol. This phenol is preferred because it possesses only one reactive site, possesses a low volatility and possesses a similar reactivity to bisphenol-A. The model transesterification reaction was carried out at temperatures above the melting points of the certain diarylcarbonate and p-(1,1,3, 3-tetramethyl)butylphenol and in the presence of a transesterification catalyst, which is usually an aqueous solution of sodium hydroxide or sodium phenoxide. Preferred concentrations of the transesterification catalyst are 0.001 mole % based on the number of moles of the phenol or diarylcarbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant was determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses a relative equilibrium constant ($K_{test}/K_{DPC}$) of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diphenylcarbonate.

Some non-limiting examples of non-activating groups which, when present in an ortho position relative to the carbonate group, would not be expected to result in activated carbonates are alkyl, cycolalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

The carbonate may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, etc. Non-limiting examples of dicarboxylic acid esters include diphenyl sebacate, diphenyl terephthalate, diphenyl isophthalate, diphenyl decanedioate, diphenyl dodecanedioate, etc. Non-limiting examples of dicarboxylic acid halides include terephthaloyl chloride, isophthaloyl chloride, sebacoyl chloride, decanedioyl chloride, dodecanedioyl chloride, etc. Such polyester-polycarbonate units may be present in proportions of up to 50 mole %, preferably not more than 30 mole %, in copolymerized polycarbonates in accordance with the present invention.

The theoretical stoichiometry of the reaction within the equilibration vessel requires a molar ratio of dihydroxy compound to diaryl carbonate composition of 1:1. However, in practicing the present invention the molar ratio in the equilibration vessel is typically between 0.25:1 to 3:1, more preferably 1:0.95 to 1:1.05 and more preferably 1:0.98 to 1:1.02.

The Dihydroxy:

The dihydroxy compound is not limited to aromatic dihydroxy compounds. However, such dihydroxy aromatic compounds are frequently preferred for use in these types of applications. It is contemplated that the dihydroxy compound comprises aliphatic diols and/or acids. The following is a non limiting list of such compounds:

Aliphatic Diols:

Isosorbide: 1,4:3,6-dianhydro-D-sorbitol, Tricyclodecane-dimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is further contemplated that the dihydroxy composition comprises a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure,

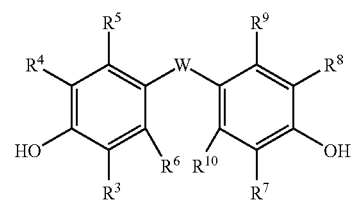

wherein $R^3$–$R^{10}$ are independently a hydrogen atom, halogen atom, nitro group, cyano group, $C_1$–$C_{20}$ alkyl radical, $C_4$–$C_{20}$ cycloalkyl radical, or $C_6$–$C_{20}$ C aryl radical; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

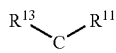

wherein $R^{11}$ and $R^{12}$ are independently a hydrogen atom, $C_1$–$C_{20}$ alkyl radical, $C_4$–$C_{20}$ cycloalkyl radical, or $C_4$–$C_{20}$ aryl radical; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$, aralkyl, $C_5$–$C_{20}$ cycloalkyl groups, or a combination thereof; dihydroxy benzenes having structure

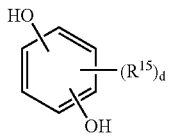

wherein $R^{15}$ is independently at each occurrence a hydrogen atom, halogen atom, nitro group, cyano group, $C_1$–$C_{20}$ alkyl radical, $C_4$–$C_{20}$ cycloalkyl radical, or $C_4$–$C_{20}$ aryl radical, d is an integer from 0 to 4; and dihydroxy naphthalenes having structures,

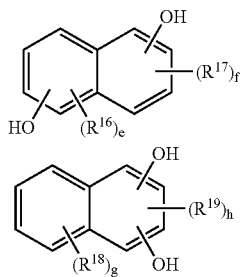

wherein $R^{16}$, $R^{17}$, $R^{18}$ and $R^{19}$ are independently at each occurrence a hydrogen atom, halogen atom, nitro group, cyano group, $C_1$–$C_{20}$ alkyl radical, $C_4$–$C_{20}$ cycloalkyl radical, or $C_4$–$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5- trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, and 1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene.

Suitable dihydroxy naphthalenes are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of BPA and other comonomers are selected based on the desired composition of the oligomers. If other comonomers are used, they can be added as part of the same feed, in a separate feed, or both.

The Activated Carbonate Reside and Solvents:

The reaction components of the present invention comprise a polycarbonate oligomer, an activated carbonate residue, and a transesterification catalyst. The activated carbonate residue will also herein be referred to as a solvent. The solvent may be a single activated carbonate residue or a mixture activated carbonate residues and other solvents. Typically the solvent present in the solution of the oligomeric polycarbonate comprises from 1 percent by weight to 99 percent by weight, preferably from 1 percent by weight to 70 percent by weight of the solution. For example a solution of oligomeric bisphenol A polycarbonate dissolved in methyl salicylate is 40 percent by weight of the oligomeric polycarbonate and 60 percent by weight methyl salicylate. Alternatively the solution may comprise more than one solvent, for example a solution of oligomeric bisphenol A polycarbonate dissolved in a mixture of ortho-dichlorobenzene (ODCB) and methyl salicylate, the solution being 40 percent by weight of oligomeric polycarbonate, 30 percent by weight ODCB, and 30 percent by weight methyl salicylate.

In one embodiment of the present invention the solvent employed comprises at least one ester-substituted phenol (i.e. activated carbonate residue) having the structure,

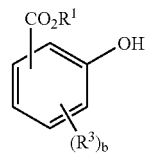

wherein $R^1$ is a $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is an integer 0–4.

Examples of ester-substituted phenols (i.e. activated carbonate residues) include methyl salicylate, ethyl salicylate, propyl salicylate, butyl salicylate, 4-chloro methyl salicylate, benzyl salicylate and mixtures thereof. Typically, methyl salicylate is preferred. Further the solvent may be recovered and reused. For example, ester-substituted phenols such as methyl salicylate may be recovered, purified, and reacted with phosgene to make ester-substituted diaryl carbonates which in turn can be used to prepare oligomeric polycarbonates. Typically, purification of the recovered ester-substituted phenol is efficiently carried out by distillation.

The solvent used according to the method of the present invention optionally comprises a halogenated aliphatic solvent, a halogenated aromatic solvent, a non-halogenated aromatic solvent, a non-halogenated aliphatic solvent, or a mixture thereof. Halogenated aromatic solvents are illustrated by ortho-dichlorobenzene (ODCB), chlorobenzene and the like. Non-halogenated aromatic solvents are illustrated by toluene, xylene, anisole, phenol; 2,6-dimethylphenol; and the like. Halogenated aliphatic solvents are illustrated by methylene chloride; chloroform; 1,2-dichloroethane; and the like. Non-halogenated aliphatic solvents are illustrated by ethanol, acetone, ethyl acetate, cyclohexanone, and the like.

In one embodiment of the present invention the solvent employed comprises a mixture of a halogenated aromatic solvent and an ester-substituted phenol, for example a mixture of ortho-dichlorobenzene (ODCB) and methyl salicylate.

The Transesterification Catalyst:

A catalyst system used in the method of the present invention comprises a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The quaternary ammonium compound is selected from the group of organic ammonium compounds having structure,

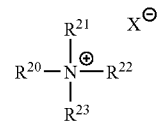

wherein $R^{20}$–$R^{23}$ are independently a $C_1$–$C_{20}$ alkyl radical, $C_4$–$C_{20}$ cycloalkyl radical, or a $C_4$–$C_{20}$ aryl radical; and $X^-$ is an organic or inorganic anion. In one embodiment of the present invention anion $X^{31}$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

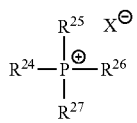

wherein $R^{24}$–$R^{27}$ are independently a $C^1$–$C^{20}$ alkyl radical, $C^4$–$C^{20}$ cycloalkyl radical, or a $C_4$–$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$–$R^{23}$ are each methyl groups and $X^-$ is carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred. Further sodium hydroxide is often contained within the reaction components as an impurity and is contained in such an amount to catalyze the reaction without the addition of additional catalysts.

In order to achieve the formation of polycarbonate using the method of the present invention an effective amount of catalyst must be employed. The amount of catalyst employed is typically based upon the total number of moles of dihydroxy compounds employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1 \times 10^{-2}$ and $1 \times 10^{-5}$, preferably between $1 \times 10^{-3}$ and $1 \times 10^{-4}$ moles per mole of the first and second dihydroxy compounds combined. The inorganic metal hydroxide catalyst typically will be used in an amount corresponding to between $1 \times 10^{-4}$ and $1 \times 10^{-8}$, preferably $1 \times 10^{-4}$ and $1 \times 10^{-7}$ moles of metal hydroxide per mole of the first and second dihydroxy compounds combined.

In a third catalyst system according to the method of the present invention, solely a alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

The Process:

Typically, the oligomeric polycarbonate introduced to the back vented extruder is prepared by heating a dihydroxy compound with an ester-substituted diaryl carbonate in the presence of a transesterification catalyst. The reactants are typically combined in a vessel in a ratio between 0.95 and 1.3 moles, preferably between 1.0 and 1.05 moles of ester-substituted diaryl carbonate per mole of dihydroxy aromatic compound. The amount of transesterification catalyst employed is between $1.0 \times 10^{-8}$ and $1 \times 10^{-3}$, preferably between $1.0 \times 10^{-6}$ and $2.5 \times 10^{-4}$ moles of transesterification catalyst per mole of dihydroxy aromatic compound employed. Upon heating the mixture at one or more temperatures in a range from 100° C. to 400° C., preferably from 100° C. to 300° C., and still more preferably from 150° C. to 250° C., reaction occurs to produce a solution comprising an equilibrium mixture of oligomeric polycarbonate, by-product ester-substituted phenol (solvent), transesterification catalyst, and low levels of the starting materials, dihydroxy compound and ester-substituted diaryl carbonate. This is referred to as "equilibrating" the reactants. Typically the equilibrium strongly favors the formation of product oligomeric polycarbonate and by-product ester-substituted phenol and only traces of the starting materials are observed. The "equilibrated" product mixture is then introduced into a back vented devolatilizing extruder to effect removal of the by-product ester-substituted phenol solvent while converting the oligomeric polycarbonate into a higher molecular weight product polycarbonate. Because, the transesterification catalyst is typically neither consumed in the equilibration step nor removed prior to extrusion, there is typically no need to add additional catalyst during extrusion. Where no additional catalyst is added, the amount of catalyst present during extrusion step (expressed in terms of moles catalyst per mole of polycarbonate repeat units in the oligomeric polycarbonate) will closely approximate the amount of catalyst used in the equilibration step, expressed in moles catalyst per mole dihydroxy aromatic compound.

In some instances it may be desirable to remove a portion of the ester-substituted phenol formed during the equilibration of the monomers. This may be effected by a batch concentration step, for example, heating the mixture of monomers and the transesterification catalyst under vacuum, typically from 0.01 atmospheres to 0.9 atmospheres, and distilling off a portion of the ester-substituted phenol. This may be further accomplished by a continuous concentration step, for example, a flash tank may be incorporated to remove solvent prior to its introduction to the back vented extruder. As ester-substituted phenol is distilled from the mixture undergoing the equilibration reaction, the molecular weight of the oligomeric polycarbonate will tend to increase. If sufficient ester-substituted phenol by-product is removed, the number average molecular weight ($M_n$) of the polycarbonate product may be in excess of 5000 Daltons and in some instances in excess of 8000 Daltons. Thus, in one aspect of the present invention a mixture comprising at least a dihydroxy compound is reacted with at least one ester-substituted diaryl carbonate in the presence of a transesterification catalyst at a temperature between 100° C. and 300° C. and a portion of the by-product ester-substituted phenol is removed by distillation either in batch operation, continuous operation, or a combination of both. The equilibration product may be a mixture comprising an ester-substituted phenol solvent and polycarbonate oligomers and having a number average molecular weight in excess of 5000 Daltons. This equilibration product is then fed to a back vented devolatilizing extruder wherein the polycarbonate is converted to still higher molecular weight product polycarbonate, said product polycarbonate having a high level of endcapping, a low level of Fries product, and a low level of residual solvent. In one embodiment of the present invention, a portion of the ester-substituted phenol formed during equilibration is distilled from the mixture undergoing equilibration and a like amount of ODCB is added to provide a solution comprising a polycarbonate having a number average molecular weight in excess of 5000 Daltons, ester-substituted phenol and ODCB. This solution is then fed to a devolatilizing extruder wherein the polycarbonate is converted to a product polycarbonate having a higher molecular weight, said product polycarbonate having a Fries content of under 100 ppm, an endcapping level of at least 90%, and less than 1 percent by weight solvent. Typically, in instances in which the polycarbonate formed in the equilibration reaction has a number average molecular weight in excess of 5000 Daltons, it will have a $M_n$ value in a range between 5000 Daltons and 15000 Daltons.

The oligomeric polycarbonate mixture may be prepared by a variety of other methods in addition to the equilibration method described and the method is not particularly limited. For example, oligomeric bischloroformates of bisphenols may be prepared by reaction of one or more bisphenols with phosgene under interfacial conditions in a methylene chloride water mixture at low pH. Such bischloroformates may then be further reacted under interfacial conditions with an ester-substituted phenol, for example methyl salicylate, to afford an oligomeric polycarbonate comprising ester-substituted terminal phenoxy groups in methylene chloride solution. The product oligomeric polycarbonate in solution may then be subjected to the method of the present invention. Catalysts employed during the interfacial reaction are typically removed from the solution of the oligomeric polycarbonate in a series of washing steps in which the methylene chloride solution of the oligomeric polycarbonate is washed repeatedly with water to remove sodium chloride. Under such circumstances, additional catalyst may be required and may be added during or just prior to the extrusion step.

In one embodiment, a monofunctional phenol chainstopper is added to a solution of an oligomeric polycarbonate comprising ester-substituted phenoxy terminal groups, said oligomeric polycarbonate being prepared using the equilibration technique described herein. The solution is then subjected to extrusion devolatilization to afford a product polycarbonate incorporating terminal phenoxy groups derived from said chainstopper. Suitable monofunctional phenol chainstoppers include p-cumylphenol and cardanol.

The extruder used according to the method of the present invention is a back venting devolatilizing extruder. That is, it is an extruder adapted for separating substantial amounts of solvent from a polymer-solvent mixture with the use of back venting. The extruder, therefore must possess at least one and preferably a greater number of vents adapted for solvent removal located upstream from the feed port of the oligomer mixture to the extruder. As mentioned a back vent of the extruder of the present invention is located such that the resistance to flow of the reaction components from the feed port to the back vent port is less than or equal to the resistance to flow of the reaction components from the feed port to the polycarbonate exit port. FIG. 1 illustrates a devolatilizing extruder and feed system suitable for use according to the method of the present invention. In one embodiment of the invention reaction components comprising an ester-substituted diaryl carbonate, a dihydroxy compound and a transesterification catalyst are combined in a reaction vessel 10 and heated at a temperature in a range between 100° C. and 300° C., preferably between 150° C. and 250° C., at a pressure between 1 atmosphere and 10 atmospheres, preferably between 1 and 2 atmospheres, to provide a solution of an oligomeric polycarbonate in an ester-substituted phenol. The solution is transferred by means of a gear pump 12 via piping 14 which is directly plumbed into a fourteen barrel, vented, twin screw extruder 20, said extruder possessing screw design 30. The extruder is operated at a temperature between 100° C. and 400° C., preferably between 200° C. and 350° C., at a screw speed between 50 and 1200 rpm. The solution is introduced into the upstream edge of barrel five 22. The segmentations along the extruder indicate the transitions from one extruder barrel to the next. The extruder is equipped with two back vents 25 and 27, here located on the upstream side of barrels one 24 and barrel four 26. The extruder screw design 30 consists of conveying screw elements illustrated by 32 and mixing sections which include an initial mixing section 34 and four zones of intense mixing 36. Vents 25, 27, and 40 are house vacuum vents, and are connected to a manifold 42 for removal of ester-substituted phenol solvent and other volatile by-products contained within the oligomeric feed and those formed as the oligomeric polycarbonate is converted into product polycarbonate within the extruder. Solvent vapors and other volatile by-products are condensed in a shell and tube condenser 44 which is attached to a source of house vacuum 46. The extruder is further equipped with three vacuum vents 50, 52, and 54. Vacuum vent 50 is connected via a cold trap 56 to a vacuum pump 58. Vacuum vents 52 and 54 are connected via cold trap 60 to a vacuum pump 62. As mentioned, the extruder comprises four mixing sections which provide for intense mixing of the contents of the extruder. These are indicated in the screw design 30 as the mixing sections labeled 36. Mixing sections labeled 36 in the screw design are believed to provide for enhanced rates of polycarbonate chain growth relative to other domains within the extruder.

The extruder used according to the method of the present invention is typically operated at one or more temperatures in a range between 100° C. and 400° C. and at one or more screw speeds in a screw speed range, said range being between 50 revolutions per minute (rpm) and 1200 rpm, preferably between 50 rpm and 500 rpm.

Extruders suitable for use according to the method of the present invention include co-rotating intermeshing double screw extruders, counter-rotating non-intermeshing double screw extruders, single screw reciprocating extruders, single screw non-reciprocating extruders, and a multiple screw extruder.

It is a general principle of extruder operation that as the feed rate is increased a corresponding increase in the screw speed must be made in order to accommodate the additional material being fed. Moreover, the screw speed determines the residence time of the material being fed to the extruder, here the solution of the oligomeric polycarbonate and transesterification catalyst. Thus the screw speed and feed rate are typically interdependent. It is useful to characterize this relationship between feed rate and screw speed as a ratio. Typically the extruder is operated such that the ratio of starting material introduced into the extruder in pounds per hour to the screw speed expressed in rpm falls within a range of from 0.01 to 100, preferably from 0.05 to 1. For example, the ratio of feed rate to screw speed where the solution comprising an oligomeric polycarbonate and transesterification catalyst is being introduced at 1000 pounds per hour into an extruder being operated at 400 rpm is 2.5. The maximum and minimum feed rates and extruder screw speeds are determined by, among other factors, the size of the extruder, the general rule being the larger the extruder the higher the maximum and minimum feed rates.

In one embodiment of the present invention, a mixture of an oligomeric polycarbonate and a solvent is heated under pressure to produce a "superheated" solution, meaning that the temperature of said superheated solution is greater than the boiling point of the solvent at a flash pressure. Typically, the temperature of the superheated oligomeric polycarbonate will be between 2° C. and 200° C. higher than the boiling point of the solvent at the flash pressure. In instances where there are multiple solvents present, the solution of oligomeric polycarbonate is "superheated" with respect to at least one of the solvent components. Where the solution of oligomeric polycarbonate contains significant amounts of both high and low boiling solvents, it may be advantageous to superheat the solution of oligomeric polycarbonate with respect to all solvents present (i.e. above the boiling point at atmospheric pressure of the highest boiling solvent). Superheating of the solution of the oligomeric polycarbonate may be achieved by heating the mixture under pressure, typically at a pressure less than 10 atmospheres. Superheated solutions of oligomeric polycarbonates are conveniently prepared in pressurized heated feed tanks, pressurized heat exchangers, extruders, pressurized reaction vessels and the like. FIG. 1 illustrates the use of a heat exchanger 70 for superheating the oligomeric feed line 14. The superheated solution is then introduced into the back vented devolatilizing extruder through a pressure control valve 72, the pressure control valve 72 having a cracking pressure higher than the flash. The back pressure generated by the pressure control valve prevents evaporation of the solvent prior to introducing the solution into the extruder. Typically, the pressure control valve 72 is attached (plumbed) directly to the extruder and serves as the principal feed inlet of the back vented extruder. The ratio of the feed pressure to the vent located upstream and adjacent to the feed port are suitably in a range from 0.01 to 1.00 sometimes more preferably from 0.1 to 1.0.

The extruder can be equipped with at least one side feeder which is operated as a vent. The back vented extruder in combination with the side feeder is equipped with one or more back vents in close proximity to the principal feed inlet comprising the pressure control valve. The side feeder is typically positioned in close proximity to the pressure control valve through which the superheated oligomeric polycarbonate is introduced into the extruder. The side feeder comprises at least one vent. Alternatively, the pressure control valve through which the superheated oligomeric polycarbonate is introduced may be attached to the side feeder itself in which instance the pressure control valve is attached to the side feeder at a position between the point of attachment of the side feeder to the extruder and the atmospheric vent located on the side feeder. In yet another embodiment, the superheated solution of oligomeric polycarbonate may be introduced through multiple pressure control valves which may be attached to the side feeder, the extruder, or to both extruder and side feeder. The heated zones of the extruder are typically operated at one or more temperatures between 100 ° C. and 400° C. The expression "wherein the extruder is operated at a temperature between 100° C. and 400° C." refers to the heated zones of the extruder, it being understood that the extruder may comprise both heated and unheated zones.

In an embodiment as depicted in FIG. 1, the superheated solution of oligomeric polycarbonate passes through the pressure control valve 72 into the feed zone of the extruder which due to the presence of the aforementioned vents is at sub-atmospheric pressure. The solvent present in the superheated solution of oligomeric polycarbonate undergoes sudden and rapid evaporation thereby effecting at least partial separation of the oligomeric polycarbonate and the solvent. The solvent vapors then are eliminated from the extruder via the back vents 25 and 27 as well as atomspheric vent 40. The vents are attached to a solvent vapor manifold and condenser in order to recover solvent and prevent its adventitious release. Additionally, the extruder is typically equipped with at least one downstream vent operated at atmospheric pressure or preferably sub-atmospheric which serves to remove solvent not removed through the back venting. Vents operated at sub-atmospheric pressure are referred to herein as "vacuum vents" and are maintained at from 1 to 30, preferably from 10 to 29 inches of mercury as measured by a vacuum gauge measuring vacuum (as opposed to a pressure gauge measuring pressure). Typically, at least two vacuum vents are preferred. In FIG. 1, vents 50, 52, and 54 are vacuum vents.

Extruders suitable for use in embodiments of the present invention wherein a superheated oligomeric polycarbonate solution is being fed include co-rating intermeshing double screw extruders, counter-rotating non-intermeshing double screw extruders, single screw reciprocating extruders, and single screw non-reciprocating extruders.

In some instances, it may be found that the product polycarbonate prepared according to the method of the present invention is of insufficient molecular weight or retains too much of the solvent originally present in the solution of the oligomeric polycarbonate. In such instances, simply subjecting the product polycarbonate to a second extrusion on the same or a different devolatilizing extruder typically results in a product polycarbonate having an increased molecular weight and a reduced level of residual solvent. Thus, in one embodiment of the present invention, a solution of an oligomeric polycarbonate and a solvent is subjected to devolatilization extrusion at a temperature between 100° C. and 400° C. on an extruder equipped with at least one vent adapted for solvent removal located upstream from and adjacent to the feed port to provide an initial product polycarbonate. The initial product polycarbonate is then introduced into a second extruder, said second extruder being equipped with at least one vacuum vent. The second extruder is operated at a temperature in a range between 100° C. and 400° C., and at a screw speed in a range between 50 and 1200 rpm.

The method of the present invention may be carried out in a batch or continuous mode. In one embodiment, the method of the present invention is carried out as a batch process wherein monomers and transesterification catalyst are equilibrated in a batch reactor to form a solution of the oligomeric polycarbonate. This solution is then fed to a back vented devolatilizing extruder and the product polycarbonate is isolated until the solution is consumed. Alternatively, the method of the present invention may be carried out as a continuous process wherein the monomers and catalyst are continuously fed to, and the solution of oligomeric polycarbonate is continuously removed from a continuous reactor. Thus a mixture of BMSC, BPA and/or other dihydroxy compounds, and a transesterification catalyst may be fed to one end of a tube reactor heated to a temperature between 160° C. and 250° C. A solution of an oligomeric polycarbonate emerges at the opposite end of the tube reactor and is fed to the back vented devolatilizing extruder from which emerges the product polycarbonate.

In yet another embodiment of the present invention a method of preparing polycarbonate is provided wherein the method comprises the steps of:

(i) forming a reaction mixture comprising at least one dihydroxy compound, an activated carbonate, and a transesterification catalyst, (ii) heating the reaction mixture at a temperature in a range between 100° C. and 300° C. to provide the reaction components comprising a polycarbonate oligomer, an activated carbonate residue, and a transesterification catalyst, (iii) removing activated carbonate residue from the reaction components prior to introduction to an extruder, (iv) heating the reaction components to a temperature greater than the boiling point of the activated carbonate residue, the boiling point being the boiling point of the activated carbonate residue at a flash pressure, the heating being carried out at a feed pressure, the feed pressure being greater than the flash pressure to provide superheated reaction components, (v) flashing the superheated reaction components to the extruder at the flash pressure through at least one pressure control valve feed port, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and (vi) extruding the reaction components at one or more temperatures in a range between 100° C. and 400° C., wherein during the extrusion of the reaction components activated carbonate residue is removed through the first back vent port.

It is understood, especially for melt reactions of the type presented in the instant invention, that purity of the monomers employed may strongly affect the properties of the product polycarbonate. Thus, it is frequently desirable that the monomers employed be free of, or contain only very limited amounts of, contaminants such as metal ions, halide ions, acidic contaminants and other organic species. This may be especially true in applications such as optical disks, (e.g. compact disks) where contaminants present in the polycarbonate can affect disk performance. Typically the concentration of metal ions, for example iron, nickel, cobalt, sodium, and potassium, present in the monomer should be less than 10 ppm, preferably less than 1 ppm and still more preferably less than 100 parts per billion (ppb). The amount of halide ion present in the polycarbonate, for example fluoride, chloride and bromide ions, should be minimized in order to inhibit the absorption of water by the product polycarbonate as well as to avoid the corrosive effects of halide ion on equipment used in the preparation of the polycarbonate. Certain applications, for example optical disks, may require very low levels of halide ion contaminants. Preferably, the level of halide ion present in each monomer employed should be less than 1 ppm. The presence of acidic impurities, for example organic sulfonic acids which may be present in bisphenols such as BPA, should be minimized since only minute amounts of basic catalysts are employed in the oligomerization and subsequent polymerization steps. Even a small amount of an acidic impurity may have a large effect on the rate of oligomerization and polymerization since it may neutralize a substantial portion of the basic catalyst employed. Lastly, the tendency of polycarbonates to degrade at high temperature, for example during molding, with concomitant loss of molecular weight and discoloration correlates strongly with the presence of contaminating species within the polycarbonate. In general, the level of purity of a product polycarbonate prepared using a melt reaction method such as the instant invention will closely mirror the level of purity of the starting monomers.

Product polycarbonates prepared by the method of the present invention frequently contain only very low levels of Fries products. In many cases no Fries product is detectable when the polycarbonate is subjected to a Fries product analysis. The Fries product analysis is carried out by completely hydrolyzing the polycarbonate and analyzing the hydrolysis product by HPLC. For bisphenol A polycarbonate produced by the method of the present invention, the level of Fries product is a value expressed as parts 2-carboxy bisphenol A per million parts of the product bisphenol A polycarbonate which was subjected to hydrolysis. For bisphenol A polycarbonates prepared using the method of the present invention this value is frequently zero or very close to it.

The product polycarbonates prepared according to the method of the present invention are found to have very high levels, frequently 90 percent or higher, of endcapping. Typically product polycarbonates will be from 97 to 99 percent endcapped. Free hydroxyl groups at the polycarbonate chain ends typically comprise less than 100 ppm of the total polymer weight. Two types of free hydroxyl chain ends are typically observed for polycarbonates prepared according to the method of the present invention from BPA and BMSC: hydroxyl groups attached to a BPA residue ("BPA OH"), and hydroxyl groups attached to a salicyl ester residue ("salicyl OH"). Typically, the concentration of "BPA OH" endgroups is less than 100 ppm based on the total weight of the product polymer. Likewise, the concentration of "salicyl OH" is typically less than 100 ppm. Endgroups bearing "salicyl OH" groups have the structure indicated by structure,

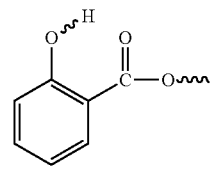

and are quantified by nuclear magnetic resonance spectroscopy (NMR). It should be noted that the concentrations of hydroxyl endgroups and percent endcapping described above refers to product polycarbonate and not the oligomeric polycarbonate. Additionally, in instances in which the product polycarbonate has been prepared by first equilibrating a mixture of an ester-substituted diaryl carbonate with one or more dihydroxy aromatic compounds to afford a solution comprising an oligomeric polycarbonate and subsequently subjecting said solution to extrusion on a devolatilizing extruder, the concentrations of hydroxyl endgroups and percent endcapping in the product polycarbonate will reflect the molar ratio of ester-substituted diaryl carbonate to total dihydroxy aromatic compound. Typically, this ratio should be in a range between 0.95 and 1.1. Typically, the product polycarbonate prepared by the method of the present invention will contain only very small amounts of residual starting dihydroxy aromatic compound (generally less than 50 ppm) and ester-substituted diaryl carbonate (generally less than 500 ppm).

The product polycarbonates prepared by the method of the present invention may optionally be blended with any conventional additives used in thermoplastics applications, such as preparing molded articles. These additives include UV stabilizers, antioxidants, heat stabilizers, mold release agents, coloring agents, antistatic agents, slip agents, antiblocking agents, lubricants, anticlouding agents, coloring agents, natural oils, synthetic oils, waxes, organic fillers, inorganic fillers, and mixtures thereof. Typically, it is preferable to form a blend of the polycarbonate and additives which aid in processing the blend to form the desired molded article, such as an optical article. The blend may optionally comprise from 0.0001 to 10% by weight of the desired additives, more preferably from 0.0001 to 1.0% by weight of the desired additives.

Examples of UV absorbers include, but are not limited to, salicylic acid UV absorbers, benzophenone UV absorbers, benzotriazole UV absorbers, cyanoacrylate UV absorbers and mixtures thereof.

Examples of the aforementioned heat-resistant stabilizers, include, but are not limited to, phenol stabilizers, organic thioether stabilizers, organic phosphite stabilizers, hindered amine stabilizers, epoxy stabilizers and mixtures thereof. The heat-resistant stabilizer may be added in the form of a solid or liquid.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acids, polyhydric alcohol esters of fatty acids, polyglycol esters of fatty acids, and other fatty acid ester mold release agents; silicone oil and other silicone mold release agents, and mixtures of any of the aforementioned.

The coloring agent may be either pigments or dyes. Inorganic coloring agents and organic coloring agents may be used separately or in combination in the invention.

The polycarbonates prepared by the method of the present invention may be random copolymers, block copolymers, branched or linear. When the product polycarbonate is branched a suitable branching agent, such as THPE, 9-carboxyoctadecandioic acid, or 1,3,5-trihydroxybenzene is employed. For example, the inclusion of 0.02 moles of THPE per mole of BPA in the equilibration reaction of 1 mole of BPA with 1.03 moles of BMSC to form a solution comprising an oligomeric polycarbonate in methyl salicylate, and subsequent extrusion of the solution on a devolatilizing extruder according to the method of the present invention will provide a branched bisphenol A polycarbonate.

Molded articles, such as a molded optical article, comprising the polycarbonates prepared by the method of the present invention, may be obtained by conventional molding techniques, for example injection molding, blow molding, and compression molding. Additionally molded articles may be prepared from a blend of the product polycarbonate with one or more additional polymers. Such blends, typically prepared using extrusion methods, may be molded using conventional techniques. Injection molding is the more preferred method of forming the molded article.

Because the polycarbonates prepared by the method of the present invention possess advantageous properties such as high impact strength, high clarity, low water absorption, good processability and low birefringence, they can be advantageously utilized to produce optical articles. End-use applications for the optical article of the invention include, but are not limited to, a digital audio disk, a digital versatile disk, an optical memory disk, a compact disk, an ASMO device and the like; optical lenses, such as contact lenses, lenses for glasses, lenses for telescopes, and prisms; optical fibers; magneto optical disks; information recording media; information transferring media; disks for video cameras, disks for still cameras and the like. Therefore the present invention further comprises molded articles and a method of making molded articles comprising the steps of:

(a) preparing a polycarbonate by,
  (i) introducing to an extruder through a feed port a plurality of reaction components comprising a polycarbonate oligomer, an activated carbonate residue, and a transesterification catalyst, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and
  (ii) extruding the reaction components at one or more temperatures in a range between 100° C. and 400° C., wherein during the extrusion of the reaction components, activated carbonate residue is removed through the first back vent port, and
(b) forming a molded article from the polycarbonate.

The polycarbonates prepared by the method of the present invention may function as the medium for data storage, i.e. the data may be fixed onto or into the polycarbonate. The polycarbonate may also function as the substrate onto which a data storage medium is applied. Further, some combination of both functions may be employed in a single device, as for instance when the polycarbonate is imprinted with tracking to aid in reading a data storage medium which is applied to the polycarbonate.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) analysis, using a polycarbonate molecular weight standard to construct a broad standard calibration curve against which polymer molecular weights were determined. The temperature of the gel permeation columns was about 25° C. and the mobile phase was chloroform.

Fries content is measured by the KOH methanolysis of resin and is reported as parts per million (ppm). The Fries content is determined as follows. First, 0.50 grams of polycarbonate is dissolved in 4.0 ml of THF (containing p-terphenyl as internal standard). Next, 3.0 mL of 18% KOH in methanol is added to this solution. The resulting mixture is stirred for two hours at room temperature. Next, 1.0 mL of acetic acid is added, and the mixture is stirred for 5 minutes. Potassium acetate by-product is allowed to crystallize over 1 hour. The solid is filtered off and the resulting filtrate is analyzed by high performance liquid chromatography (HPLC) using p-terphenyl as the internal standard.

Concentrations of "BPA-OH" and "salicyl-OH" endgroups were measured by $^{31}$P-NMR. Terminal hydroxy groups were first derivatized with 2-chloro-1,3,2-dioxaphospholane (Aldrich).

Examples 1–5

Solutions of oligomeric polycarbonate in methyl salicylate were prepared by equilibrating a mixture of bis(methyl salicyl) carbonate (BMSC), bisphenol A (BPA) and transesterification catalyst, tetrabutylphosphonium acetate (TBPA), at a temperature in a range between about 160° C. and about 220° C. in a batch melt reactor under a nitrogen atmosphere. The reaction mixture was stirred and heated until equilibrium was reached. Equilibrium was reached in about 80 minutes at about 165° C. and in about 10 minutes at about 220° C. At equilibrium, the solution of oligomeric polycarbonate prepared from mixtures of BMSC (1.03 moles BMSC per mole BPA), BPA and TBPA (2.5×10$^{-4}$ moles per mole BPA) was about 45 percent by weight polycarbonate oligomer and about 54 to about 55 percent by weight methyl salicylate.

TABLE 1

Solutions of Oligomeric Polycarbonate In Methyl Salycilate

| Ex. | [BMSC]/ [BPA] | Mole TBPA Catalyst per Mole BPA | Equil Temp ° C. | Time to Equil. (min) | Oligomeric Polycarbonate Mn |
|---|---|---|---|---|---|
| 1 | 1.03 | 2.5 × 10$^{-4}$ | 220 | 10 | 1385 |
| 2 | 1.03 | 2.5 × 10$^{-4}$ | 210 | 18 | 1474 |
| 3 | 1.03 | 2.5 × 10$^{-4}$ | 195 | 30 | 1670 |
| 4 | 1.03 | 2.5 × 10$^{-4}$ | 180 | 52 | 1849 |
| 5 | 1.03 | 2.5 × 10$^{-4}$ | 160 | 90 | 2090 |

Examples 1–5 in Table 1 illustrate both the characteristics of the equilibrated solution at different temperatures and document the truly oligomeric nature of the material being fed to the back vented extruder. The column heading "[BMSC]/[BPA]" indicates the molar ratio of BMSC and BPA employed in the equilibration reaction. The heading "$M_n$" indicates the number average molecular weight as determined by gel permeation chromatography measured using a polycarbonate molecular weight standard. Values of $M_n$ are given in Daltons. The data in Table 1 illustrate the speed at which equilibration of the reactants can be achieved. Example 1 indicates that solid reactants can be converted into a solution of an oligomeric polycarbonate and transesterification catalyst in methyl salicylate solvent in as little as ten minutes. Because residence times in the extruder are short (from about 1 to about 4 minutes on the equipment being used in the Examples which follow), the overall process of converting starting monomers into product polycarbonate can be achieved in under 15 minutes.

Examples 6–36 were prepared with the following protocols. Solutions of oligomeric bisphenol A polycarbonate in methyl salicylate were prepared as in Examples 1–5 at an equilibration temperature of between 160° C. and 220° C. using as a catalyst either TBPA alone (as in Examples 1–5) or a combination of TBPA with sodium hydroxide. The amount of catalyst employed was about 2.5×10$^{-4}$ moles TBPA per mole BPA and (when present) about 2×10$^{-6}$ moles sodium hydroxide per mole BPA. Following the equilibration reaction, the solution was transferred by means of nitrogen pressure (about 20–40 psi) to a gear pump which pumped the solution via an insulated pipe connected directly (hard plumbed) to the upstream edge of barrels four or five of a 25 millimeter diameter, 14 barrel, co-rotating intermeshing twin screw extruder having a length to diameter ratio of 56. The extruder comprised 6 vents V1–V6 located at the upstream edges of barrel one (V1, vacuum or atmospheric vent), barrels four or five (V2 vacuum or atmospheric vent), barrel seven (V3, atmospheric or vacuum vent), barrel nine (V4, vacuum vent), barrel eleven (V5, vacuum vent) and barrel thirteen (V6, vacuum vent). Vacuum vents V1, V2, V3 and V4 if open were connected to the house vacuum and operated at 10–28 in Hg of vacuum. Vacuum vents V5 and V6 were connected to a vacuum pump and operated at moderate to high vacuum (>28 in Hg of vacuum). When operated at slight to moderate vacuum (10–28 in Hg), vacuum was supplied to vents V1–V4 with "house" vacuum. In a number of instances, vacuum vent V6 or vacuum vents V5 together with V6 were operated under high (i.e. "full") vacuum (about 29 in Hg, as measured by a vacuum gauge). The vacuum vents were connected through solvent recovery manifold and condenser systems to their respective sources of vacuum. In instances in which either V6 alone or V5 and V6 were operated at "full" vacuum, the vent or vents being operated at "full" vacuum were connected via a cold trap to a vacuum pump. Vents V1–V4 were equipped with type "C" vent port inserts. Vent port inserts are available from the Werner & Pfleiderer Company. Vent port inserts differ in the cross sectional area available for the solvent vapors to escape the extruder: Type "A" inserts are the most restrictive (smallest cross section) and Type "C" are the least restrictive (largest cross section). As noted, V2 was kept closed in some instances and remained open in others. The screw design comprised conveying elements under the feed inlet and all vents. The screw design further comprised kneading blocks in four "reaction zones" (zones comprising screw elements providing intense mixing) located between vents. The data in Tables 2–13 below demonstrate the effects of changes in reaction conditions on the properties of the product polycarbonate. Further the data provided in Tables 2–13 demonstrate that polycarbonate can be produced in an extruder containing a back vent wherein the resistance to flow of the reaction components from the feed port to back vent is less than or equal to the resistance to flow of the reaction components from the feed port to the polycarbonate exit port.

Examples 6–16

A 30-gallon titanium reactor, maintained at about 175° C., was used to prepare and feed the equilibrated mixture of oligomers to the feed port of the extruder using a positive-displacement, Zenith gear pump. The feed contained an oligomeric mixture of BPA, BMSC, and catalyst (25 µeq TMAH and 2 µeq sodium hydroxide) partially reacted and pre-equilibrated in the reactor to about 55 percent by weight of methyl salicylate. The BMSC/BPA molar ratio was equal to 1.025.

The extruder was a 25 mm diameter extruder, 14-barrel (L/D=56) and a 2-hole die plate. Six vent ports were used of which two were located upstream of the feed port. Conveying elements were located under feed and all vents and kneading blocks in the reaction zones between vents. The feed port was located on the upstream edge of barrel 5 for liquid injection. The vents were located upstream of barrels 1, 4, 7, 9, 11, and 13. Vents 1, 2, 3, and 4 were connected to the house vacuum manifold which is maintained at about 28–29 in Hg of vacuum, while vents 5 and 6 were connected to two vacuum pumps connected to a manifold drawing at about 29 in Hg of vacuum. Vent inserts of type "C" were inserted into vents V1, V2, V3, and V4. Vents V5 and V6 had no insert.

Examples 17–18

A 30-gallon titanium reactor, maintained at about 170° C., was used to prepare and feed the equilibrated mixture of oligomers to the feed port of the extruder using a positive-displacement, Zenith gear pump. The feed contained an oligomeric mixture of BPA, Resorcinol, Hydroquinone and BMSC monomers, and catalyst (50 µeq TMAH and 3 µeq sodium hydroxide) partially reacted and pre-equilibrated in the reactor to about 55 percent by weight of methyl salicylate. After equilibration, some methyl salicylate was removed from the reactor to obtain a final concentration of about 35 percent by weight of methyl salicylate. The BMSC/(BPA+Re+HQ) molar ratio was equal to 1.018. The BPA/(BPA+Re+HQ) molar ratio was equal to 0.50. The Re/(BPA+Re+HQ) molar ratio was equal to 0.20. The HQ/(BPA+Re+HQ) molar ratio was equal to 0.30.

TABLE 2

| Example # | Vacuum @ Vents (in. Hg.) | | | | | | Solution Mass Flow Rate (lb/hr) | Torque (%) | Melt Temperature (C.) | Screw speed (rpm) | Die Pressure (psi) |
| | $V_1$ ($B_1$) | $V_2$ ($B_4$) | $V_3$ ($B_7$) | $V_4$ ($B_9$) | $V_5$ ($B_{11}$) | (*) $V_6$ ($B_{13}$) | | | | | |
| --- | --- | --- | --- | --- | --- | --- | --- | --- | --- | --- | --- |
| 6 | 29 | 29 | 29 | 29 | 29 | Open | 20 | 48 | 303 | 202 | TLTM |
| 7 | 29 | 29 | 29 | 28 | 29 | Open | 30 | 50 | 312 | 275 | 3 |
| 8 | 29 | 29 | 29 | 28 | 29 | Open | 40 | 47 | 321 | 353 | 16 |
| 9 | 29 | 29 | 29 | 28 | 29 | Open | 50 | 46 | 325 | 403 | 42 |
| 10 | 29 | 29 | 29 | 28 | 29 | Open | 60 | 46 | 342 | 583 | 67 |
| 11 | 29 | 29 | 29 | 28 | 29 | Open | 60 | 47 | 353 | 703 | 71 |
| 12 | 29 | 29 | 29 | 28 | 29 | Open | 40 | 52 | 357 | 703 | 60 |
| 13 | 29 | 29 | 29 | 28 | 29 | Open | 40 | 54 | 342 | 550 | 59 |
| 14 | 29 | 29 | 29 | 28 | 29 | Open | 40 | 49 | 320 | 350 | 66 |
| 15 | Closed | 29 | 29 | 28 | 29 | Open | 40 | 49 | 319 | 350 | 83 |
| 16 | 29 | 29 | 29 | 28 | 29 | Closed | 40 | 49 | 319 | 350 | 96 |

(*) $V_6$ did not have a pressure gauge

TABLE 3

| Example # | Actual Barrel Temperatures (C.) | T feed in Reactor (C.) | T feed before P-Valve (C.) | P-controlled valve (psi/% op) | Molecular Weight Mw/Mn/ PDI | Residual MS (ppm) |
| --- | --- | --- | --- | --- | --- | --- |
| 6 | 290 × 4/291/280/286/281/270 | 176 | 201 | 20/8 | 26646/11288/2.361 | 639 |
| 7 | 290 × 3/289/290/280/283/282/270 | 176 | 198 | 23/9 | 27560/12015/2.294 | 510 |
| 8 | 290 × 3/288/289/280/287/282/270 | 176 | 200 | 21/11 | 27555/12229/2.253 | 846 |
| 9 | 290 × 3/288 × 2/280/282 × 2/270 | 176 | 198 | 21/11 | 27207/12097/2.249 | 1165 |
| 10 | 290 × 3/288/289/280/283/285/271 | 176 | 198 | 21/13 | 27283/12141/2.247 | 1060 |
| 11 | 290/291/291/289/290/280/284/286/270 | 176 | 198 | 22/12 | 27681/12150/2.278 | 896 |
| 12 | 290/291/292/293/294/281/284 × 2/270 | 176 | 199 | 17/11 | 28766/12662/2.272 | 227 |
| 13 | 290/291/291/292/293/280/280/279/270 | 174 | 199 | 21/11 | 28712/12588/2.281 | 507 |
| 14 | 290 × 2/289/292/290/279/276/274/269 | 173 | 199 | 20/10 | 28033/12188/2.300 | 903 |
| 15 | 289 × 3/290/289/280/276/275/270 | 172 | 199 | 20/12 | 27830/12420/2.241 | 932 |
| 16 | 290/289 × 2/290/289/280/277 × 2/269 | 171 | 198 | 20/9 | 27557/12209/2.257 | 1069 |

The results of examples 6 through 16 are summarized in Tables 2 and 3. In these examples the polycarbonate emerging from the extruder was observed to be clear and glossy with no fouling of V2 observed. Following pelletization the level of residual methyl salicylate present in the product polycarbonate was determined by gas chromatography. The data provided in examples 6 through 16 illustrate that polycarbonate at high rates and low levels of residual methyl salicylate may be prepared using the method of the present invention. The resistance to flow of the reaction components from the feed port to V2 was less than or equal to the resistance to flow of the reaction components from the feed port to the polycarbonate exit port.

The extruder was a 25 mm diameter extruder, 14-barrel (L/D=56) and a 2-hole die plate. Six vent ports were used of which two were located upstream of the feed port. Conveying elements were located under feed and all vents and kneading blocks in the reaction zones between vents. The feed port was located on the upstream edge of barrel 5 for liquid injection. The vents were located upstream of barrels 1, 4, 7, 9, 11, and 13. Vents 1, 2, 3, and 4 were connected to the house vacuum manifold which is maintained at about 29 in Hg of vacuum, while vents 5 and 6 were connected to two vacuum pumps connected to a manifold drawing also at about 29 in Hg of vacuum. Vent inserts of type "C" were inserted into vents V1, V2, and V3. Vents V4, V5, and V6 had no insert.

TABLE 4

| Example # | Vacuum @ Vents (in. Hg.) | | | | | | Solution Mass Flow Rate (lb/hr) | Torque (%) | Melt Temperature (C.) | Screw speed (rpm) | Die Pressure (psi) |
|---|---|---|---|---|---|---|---|---|---|---|---|
| | $V_1$ ($B_1$) | $V_2$ ($B_4$) | $V_3$ ($B_7$) | $V_4$ ($B_9$) | $V_5$ ($B_{11}$) | (*) $V_6$ ($B_{13}$) | | | | | |
| 17 | 29 | 29 | 29 | 29 | 29 | Open | 15 | 48 | 302 | 200 | 56 |
| 18 | 29 | 29 | 29 | 29 | 29 | Open | 20 | 52 | 320 | 353 | 71 |

(*) $V_6$ did not have a pressure gauge

TABLE 5

| Example # | Actual Barrel Temperatures (C.) | T feed in Reactor (C.) | T feed before P-Valve (C.) | P-controlled valve (psi/% op) | Molecular Weight Mw/Mn/PDI |
|---|---|---|---|---|---|
| 17 | 292/291/290/291/281/278/281/279/269 | 172 | 174 | Five/26 | 30732/13406/2.292 |
| 18 | 290/289/290/289/279/280/280/279/271 | 170 | 175 | Five/26 | 30689/13327/2.303 |

The results of examples 17 and 18 are summarized in Table 4–5. In these examples the polycarbonate emerging from the extruder was observed to be clear and glossy with no fouling of V2 observed. The data provided in examples 17 and 18 illustrate that polycarbonate may be prepared using the method of the present invention wherein more than one monomer is incorporated into the feed and more than one vent port is located upstream from the feed port. The resistance to flow of the reaction components from the feed port to V2 was less than or equal to the resistance to flow of the reaction components from the feed port to the polycarbonate exit port.

Examples 19–20

A 30-gallon titanium reactor, maintained at about 180° C., was used to prepare and feed the equilibrated mixture of oligomers to the feed port of the extruder using a positive-displacement, Zenith gear pump. The feed contained an oligomeric mixture of BPA (55 mole %), Resorcinol (15 mole %), Hydroquinone (30 mole %) and BMSC monomers, and catalyst (25 µeq TMAH and 2 µeq sodium hydroxide) partially reacted and pre-equilibrated in the reactor to about 55 percent by weight of methyl salicylate. The BMSC/(total bisphenol) molar ratio was equal to 1.032.

The extruder was a 25 mm diameter extruder, 14-barrel (L/D=56) and a 2-hole die plate. Six vent ports were used of which two were located upstream of the feed port. Conveying elements were located under feed and all vents and kneading blocks in the reaction zones between vents. The feed port was located on the upstream edge of barrel 5 for liquid injection. The vents were located upstream of barrels 1, 4, 7, 9, 11, and 13. Vents 1, 2, 3, and 4 were connected to the house vacuum manifold which is maintained at about 29 in Hg of vacuum, while vents 5 and 6 were connected to two vacuum pumps connected to a manifold drawing also at about 29 in Hg of vacuum. Vent inserts of type "C" were inserted into vents V1, V2, and V3. Vents V4, V5, and V6 had no insert.

TABLE 6

| Example # | Vacuum @ Vents (in. Hg.) | | | | | | Solution Mass Flow Rate (lb/hr) | Torque (%) | Melt Temperature (C.) | Screw speed (rpm) | Die Pressure (psi) |
|---|---|---|---|---|---|---|---|---|---|---|---|
| | $V_1$ ($B_1$) | $V_2$ ($B_4$) | $V_3$ ($B_7$) | $V_4$ ($B_9$) | $V_5$ ($B_{11}$) | (*) $V_6$ ($B_{13}$) | | | | | |
| 19 | 29 | 29 | 29 | 29 | 29 | Open | 20 | 24 | 296 | 205 | TLTM |
| 20 | 29 | 29 | 29 | 29 | 29 | Open | 20 | 26 | 297 | 205 | TLTM |

(*) $V_6$ did not have a pressure gauge

TABLE 7

| Example # | Actual Barrel Temperatures (C.) | T feed in Reactor (C.) | T feed before P Valve (C.) | P-controlled valve (psi/% op) | Molecular Weight Mw/Mn/PDI | Residual MS (ppm) |
|---|---|---|---|---|---|---|
| 19 | 294/300/296/300/280 × 2/281 × 2/266 | 180 | 178 | Five/13 | 22588/10931/2.066 | 415 |
| 20 | 300 × 2/296/300/280 × 5 | 178 | 178 | Four/13 | 22926/11060/2.073 | 345 |

The results of examples 19 and 20 are summarized in Tables 6 and 7. In these examples the polycarbonate emerging from the extruder was observed to be clear and glossy with no fouling of V2 observed. Following pelletization the level of residual methyl salicylate present in the product polycarbonate was determined by gas chromatography. The resistance to flow of the reaction components from the feed port to V2 was less than or equal to the resistance to flow of the reaction components from the feed port to the polycarbonate exit port.

Examples 21–24

A 30-gallon titanium reactor, maintained at about 175° C., was used to prepare and feed the equilibrated mixture of oligomers to the feed port of the extruder using a positive-displacement, Zenith gear pump. The feed contained an oligomeric mixture of BPA, BMSC monomers, and catalyst (25 µeq TMAH and 2 µeq sodium hydroxide) partially reacted and pre-equilibrated in the reactor to about 55 percent by weight of methyl salicylate. The BMSC/BPA molar ratio was equal to 1.02.

The extruder was a 25 mm diameter extruder, 14-barrel (L/D=56) and a 2-hole die plate. Six vent ports were used of which two were located upstream of the feed port. Conveying elements were located under feed and all vents and kneading blocks in the reaction zones between vents. The feed port was located on the upstream edge of barrel 5 for liquid injection. The vents were located upstream of barrels 1, 4, 7, 9, 11, and 13. Vents 1, 2, 3, and 4 were connected to the house vacuum manifold which is maintained at about 28 to 29 in Hg of vacuum, while vents 5 and 6 were connected to two vacuum pumps connected to a manifold drawing at about 29 in Hg of vacuum. Vent insert of type "C" was inserted into vent V3. Vents V1, V2, V4, V5, and V6 had no insert.

polycarbonate was determined by gas chromatography. The data provided in examples 21 through 24 illustrate that polycarbonate may be prepared using the method of the present invention and that the back vented extruder may be operated at a range of throughput rates to obtain a product that contains less than about 0.1 percent by weight methyl salicylate (MS). Further, the resistance to flow of the reaction components from the feed port to V2 was less than or equal to the resistance to flow of the reaction components from the feed port to the carbonate exit port.

Examples 25–27

A 30-gallon titanium reactor, maintained at about 175° C., was used to prepare and feed the equilibrated mixture of oligomers to the feed port of the extruder using a positive-displacement, Zenith gear pump. The feed contained an oligomeric mixture of BPA (50 mole %), resorcinol (20 mole %), hydroquinone (30 mole %) and BMSC monomers, and catalyst (25 µeq TMAH and 2 µeq sodium hydroxide) partially reacted and pre-equilibrated in the reactor to about 55 percent by weight of methyl salicylate. The BMSC/(total bisphenol) molar ratio was equal to 1.017.

The extruder was a 25 mm diameter extruder, 14-barrel (L/D=56) and a 2-hole die plate. Six vent ports were used of which two were located upstream of the feed port. Conveying elements were located under feed and all vents and kneading blocks in the reaction zones between vents. The feed port was located on the upstream edge of barrel 5 for liquid injection. The vents were located upstream of barrels 1, 4, 7, 9, 11, and 13. Vents 1, 2, 3, and 4 were connected to the house vacuum manifold which is maintained at about 28

TABLE 8

| | | Vacuum @ Vents (in. Hg.) | | | | Solution Mass | | Screw | | |
|---|---|---|---|---|---|---|---|---|---|---|
| Example # | $V_1$ ($B_1$) | $V_2$ ($B_4$) | $V_3$ ($B_7$) | $V_4$ ($B_9$) | $V_5$ ($B_{11}$) | (*) $V_6$ ($B_{13}$) | Flow Rate (lb/hr) | Torque (%) | Melt Temperature (C.) | speed (rpm) | Die Pressure (psi) |
| 21 | Closed | 29 | 29 | 29 | 29 | Open | 20 | 54 | 309 | 199 | TLTM |
| 22 | Closed | 29 | 29 | 29 | 29 | Open | 30 | 59 | 325 | 305 | TLTM |
| 23 | Closed | 29 | 29 | 29 | 29 | Open | 40 | 55 | 335 | 402 | TLTM |
| 24 | Closed | 29 | 29 | 29 | 29 | Open | 50 | 53 | 345 | 500 | TLTM |

(*) $V_6$ did not have a pressure gauge

TABLE 9

| Example # | Actual Barrel Temperatures (C.) | T feed in Reactor (C.) | T feed before P Valve (C.) | Molecular Weight Mw/Mn/ PDI | Residual MS (ppm) |
|---|---|---|---|---|---|
| 21 | 290/297/294/294/297/291/285/283/281 | 175 | 184 | 31721/13597/2.333 | 178 |
| 22 | 290/301/299/299/303/290/283/282/280 | 175 | 184 | 31753/13585/2.337 | 246 |
| 23 | 290/300/298/298/300/290/282/282/280 | 175 | 184 | 31693/13570/2.336 | 411 |
| 24 | 290/300/297/297/298/291/283/283/280 | 175 | 185 | 31326/13446/2.330 | 486 |

The results of examples 21 through 24 are summarized in Tables 8 and 9. In these examples the polycarbonate emerging from the extruder was observed to be clear and glossy with no fouling of V2 observed. Following pelletization the level of residual methyl salicylate present in the product to 29 in Hg of vacuum, while vents 5 and 6 were connected to two vacuum pumps connected to a manifold drawing at about 29 in Hg of vacuum. Vent inserts of type "C" were inserted into vents V2 and V3. Vents V1, V4, V5, and V6 had no insert.

TABLE 10

| Example # | Vacuum @ Vents (in. Hg.) | | | | | | Solution Mass | | Screw | | |
|---|---|---|---|---|---|---|---|---|---|---|---|
| | $V_1$ ($B_1$) | $V_2$ ($B_4$) | $V_3$ ($B_7$) | $V_4$ ($B_9$) | $V_5$ ($B_{11}$) | (*) $V_6$ ($B_{13}$) | Flow Rate (lb/hr) | Torque (%) | Melt Temperature (C.) | speed (rpm) | Die Pressure (psi) |
| 25 | 29 | 28 | 29 | 28 | 29 | Open | 15 | 44 | 309 | 201 | TLTM |
| 26 | 29 | 28 | 29 | 28 | 29 | Open | 15 | 46 | 310 | 201 | 3 |
| 27 | 29 | 28 | 29 | 28 | 29 | Open | 16 | 42 | 307 | 179 | 41 |

(*) $V_6$ did not have a pressure gauge

TABLE 11

| Example # | Actual Barrel Temperatures (C.) | T feed in Reactor (C.) | T feed before P Valve (C.) | P-controlled valve (psi/% op) | Molecular Weight Mw/Mn/ PDI | Residual MS (ppm) |
|---|---|---|---|---|---|---|
| 25 | 290 × 4/280 × 2/281 × 2/280 | 176 | 179 | Five/13 | 34597/14648/2.362 | 258 |
| 26 | 290 × 4/280 × 5 | 176 | 179 | Five/13 | 35763/15544/2.301 | 229 |
| 27 | 290 × 4/280 × 5 | 175 | 179 | Five/13 | 34952/14830/2.357 | 389 |

The results of examples 25 through 27 are summarized in Tables 10 and 11. In these examples the polycarbonate emerging from the extruder was observed to be clear and glossy with no fouling of V2 observed. Following pelletization the level of residual methyl salicylate present in the product polycarbonate was determined by gas chromatography. The data provided in examples 25 through 27 illustrate the present invention in that co-polycarbonates of higher $M_w$ may be prepared by using a (BMSC/total bisphenol) ratio closer to 1.0 and that the resistance to flow of the reaction components from the feed port to V2 was less than or equal to the resistance to flow of the reaction components from the feed port to the polycarbonate exit port.

Examples 28–36

A 30-gallon titanium reactor, maintained at about 185° C., was used to prepare and feed the equilibrated mixture of oligomers to the feed port of the extruder using a positive-displacement, Zenith gear pump. The feed contained an oligomeric mixture of BPA and BMSC monomers, and catalyst (25 μeq TMAH and 2 μeq sodium hydroxide) partially reacted and pre-equilibrated in the reactor to about 55 percent by weight of methyl salicylate. The BMSC/BPA molar ratio was equal to 1.02.

The extruder was a 25mm diameter extruder, 14-barrel (L/D=56) and a 2-hole die plate. Six vent ports were used of which two were located upstream of the feed port. Conveying elements were located under feed and all vents and kneading blocks in the reaction zones between vents. The feed port was located on the upstream edge of barrel 5 for liquid injection. The vents were located upstream of barrels 1, 4, 7, 9, 11, and 13. Vents 1, 2, 3, and 4 were connected to the house vacuum manifold which is maintained at about 29–29 in Hg of vacuum, while vents 5 and 6 were connected to two vacuum pumps connected to a manifold drawing at about 29 in Hg of vacuum. Vent insert of type "C" was inserted into vent V3. Vents V1, V2, V4, V5, and V6 had no insert.

TABLE 12

| Example # | Vacuum @ Vents (in. Hg.) | | | | | | Solution Mass | | Screw | | |
|---|---|---|---|---|---|---|---|---|---|---|---|
| | $V_1$ ($B_1$) | $V_2$ ($B_4$) | $V_3$ ($B_7$) | $V_4$ ($B_9$) | $V_5$ ($B_{11}$) | (*) $V_6$ ($B_{13}$) | Flow Rate (lb/hr) | Torque (%) | Melt Temperature (C.) | speed (rpm) | Die Pressure (psi) |
| 28 | 29 | 29 | 28 | 29 | 29 | Open | 20 | 56 | 356 | 600 | 3 |
| 29 | 29 | 29 | 28 | 29 | 29 | Open | 30 | 58 | 359 | 600 | 16 |
| 30 | 29 | 29 | 28 | 29 | 29 | Open | 40 | 54 | 358 | 600 | 39 |
| 31 | 29 | 29 | 28 | 29 | 29 | Open | 50 | 51 | 354 | 600 | 56 |
| 32 | 29 | 29 | 28 | 29 | 29 | Open | 60 | 50 | 350 | 600 | 77 |
| 33 | 29 | 29 | 28 | 29 | 29 | Open | 70 | 45 | 346 | 600 | 103 |
| 34 | 29 | 29 | 28 | 29 | 29 | Open | 80 | 45 | 360 | 700 | 108 |
| 35 | 29 | 29 | 28 | 29 | 29 | Open | 40 | 49 | 333 | 400 | 114 |
| 36 | 29 | 29 | 28 | 29 | 29 | Open | 30 | 52 | 322 | 300 | 122 |

(*) $V_6$ did not have a pressure gauge

TABLE 13

| Example # | Actual Barrel Temperatures (C.) | T feed in Reactor (C.) | T feed before P Valve (C.) | P-controlled valve (psi/% op) | Molecular Weight Mw/Mn/PDI | Residual MS (ppm) |
|---|---|---|---|---|---|---|
| 28 | 280 × 3/279/284/280/294/287/271 | 184 | 182 | Two/14 | 32293/14343/2.25 | 55.9 |
| 29 | 280 × 3/277/281/280/288/284/279 | 184 | 182 | Three/14 | 33100/14745/2.24 | 86.3 |
| 30 | 280 × 3/278 × 2/280/283/281/280 | 184 | 181 | Seven/14 | 33024/14712/2.24 | 244 |
| 31 | 280 × 2/279/278/277/280 × 2/279/280 | 184 | 181 | 13/14 | 31725/14121/2.25 | 552 |
| 32 | 280 × 2/279 × 2/277/280/279 × 2/280 | 184 | 182 | 25/14 | 30972/13890/2.23 | 943 |
| 33 | 280 × 2/278/279/277/280/278/280/280 | 183 | 183 | 32/14 | 29716/13303/2.23 | 1363 |
| 34 | 280 × 2/278/279/278/280/281/282/281 | 178 | 185 | One/31 | 30957/13830/2.24 | 1023 |
| 35 | 280 × 2/279/284/282/280/277/275/279 | 177 | 184 | Five/31 | 31236/13867/2.25 | 713 |
| 36 | 280/279/278/284/283/280/276/274/279 | 176 | 185 | Five/31 | 31853/14119/2.26 | 563 |

The results of examples 28 through 36 are summarized in Tables 12 and 13. In these examples the polycarbonate emerging from the extruder was observed to be clear and glossy with no fouling of V2 observed. Following pelletization the level of residual methyl salicylate present in the product polycarbonate was determined by gas chromatography. The data provided in these examples provide further conditions that the process may be operated at relatively high rates of up to 80 lb/hr with a good balance of molecular weight and residual methyl salicylate in the final product polycarbonate while the resistance to flow of the reaction components from the feed port to V2 was less than or equal to the resistance to flow of the reaction components from the feed port to the polycarbonate exit port.

The invention claimed is:

1. A method for preparing polycarbonate wherein the method comprises the steps of,
   (i) introducing to an extruder through a feed port a plurality of reaction components comprising a polycarbonate oligomer, an activated carbonate residue, and a transesterification catalyst, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and
   (ii) extruding the reaction components at one or more temperatures in a range between 100° C. and 400° C., wherein during the extrusion of the reaction components, activated carbonate residue is removed through the first back vent port,
thereby preparing a polycarbonate.

2. The method of claim 1, wherein no element is located between the feed port and the first back vent port that restricts the flow of the reaction components from the feed port to the first back vent port.

3. The method of claim 1, wherein no active element is located between the feed port and the first back vent port that restricts the flow of the reaction components from the feed port to the first back vent port.

4. The method of claim 1, wherein the extruder further comprises a front vent port located between the feed port and the polycarbonate exit port, wherein during the extrusion of the reaction components, activated carbonate residue is removed through the front vent port.

5. The method of claim 1, wherein the polycarbonate comprises polycarbonate repeat units derived from more than one dihydroxy aromatic compound.

6. The method of claim 1, wherein the activated carbonate residue comprises from 1% to 70% by weight of the total weight of the reaction components introduced to the extruder.

7. The method of claim 1, wherein the activated carbonate residue comprises at least one ester-substituted phenol having structure I,

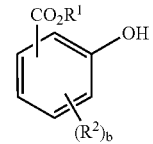

I wherein $R^1$ is a $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is an integer 0–4.

8. The method of claim 7, wherein the activated carbonate residue comprises methyl salicylate.

9. The method of claim 7, wherein the reaction components further comprise a solvent selected from the group consisting of a halogenated aromatic solvent, a halogenated aliphatic solvent, a non-halogenated aromatic solvent, and a non-halogenated aliphatic solvent.

10. The method of claim 9, wherein the solvent is orthodichlorobenzene.

11. The method of claim 1, wherein the reaction components further comprise a monofunctional phenol chainstopper.

12. The method of claim 11, wherein the chainstopper is p-cumylphenol.

13. The method of claim 1, wherein the extruder has a screw speed, the reaction components being introduced into the extruder at a feed rate, the feed rate and the screw speed having a ratio, the extruder being operated such that the ratio of feed rate in pounds per hour to the screw speed expressed in revolutions per minute falls within a range of from 0.01 to 100.

14. The method of claim 13, wherein the screw speed is in a range between 50 and 1,200 revolutions per minute.

15. The method of claim 1, wherein the extruder is selected from the group consisting of a co-rotating intermeshing double screw extruder, a counter-rotating non-intermeshing double screw extruder; a single screw reciprocating extruder, a single screw non-reciprocating extruder, and a multiple screw extruder.

16. The method of claim 1, wherein the back vent port port is operated at or below atmospheric pressure.

17. The method of claim 1, further comprising the steps,
(i) heating the reaction components to a temperature greater than the boiling point of the activated carbonate residue, the boiling point being the boiling point of the activated carbonate residue at a flash pressure, the heating being carried out at a feed pressure, the feed pressure being greater than the flash pressure to provide superheated reaction components, and
(ii) flashing the superheated reaction components to the extruder at the flash pressure through at least one pressure control valve.

18. The method of claim 17, wherein the extruder is selected from the group consisting of a co-rotating intermeshing double screw extruder, a counter-rotating non-intermeshing double screw extruder, a single screw reciprocating extruder, a single screw non-reciprocating extruder, and a multiple screw extruder.

19. The method of claim 17, wherein the first back vent port is operated at the flash pressure which is lower than that of the feed pressure.

20. The method of claim 19, wherein the ratio of (feed pressure/the pressure of the first back vent port) is in a range of greater than 0.01 and less than 1.

21. The method of claim 20, wherein the ratio of (feed pressure/the pressure of the first back vent port) is in a range of greater than 0.1 and less than 1.

22. The method of claim 1, further comprising the step of removing a product polycarbonate from the extruder.

23. The method of claim 22, wherein the product polycarbonate is introduced into a second extruder, the second extruder comprising a vent port, and the second extruder being operated at a temperature in a range between 100° C. and 400° C., wherein during the extrusion of the product polycarbonate, activated carbonate residue is removed through the vent port.

24. The method of claim 23, wherein the second extruder is selected from the group consisting of a co-rotating intermeshing double screw extruder, a counter-rotating non-intermeshing double screw extruder, a single screw reciprocating extruder, and a single screw non-reciprocating extruder.

25. The method of claim 23, wherein the second extruder has a screw speed, the polycarbonate being introduced into the second extruder at a feed rate, the feed rate and the screw speed having a ratio, the second extruder being operated such that the ratio of feed rate in pounds per hour to the screw speed expressed in revolutions per minute falls within a range of from 0.01 to 100.

26. The method of claim 25, wherein the screw speed of the second extruder is in a range between 50 and 1,200 revolutions per minute.

27. The method of claim 1, wherein the method further comprises the steps of:
(i) forming a reaction mixture comprising at least one dihydroxy compound, an activated carbonate, and a transesterification catalyst, and
(ii) heating the reaction mixture at a temperature in a range between 100° C. and 300° C. to provide a plurality of reaction components comprising a polycarbonate oligomer, an activated carbonate residue, and a transesterification catalyst.

28. The method of claim 27, wherein the method further comprises the step of removing activated carbonate residue from the reaction components prior to introduction to the extruder.

29. The method of claim 28, wherein the step of removing activated carbonate residue from the reaction components prior to introduction to the extruder is accomplished by the use of a flash tank.

30. The method of claim 28, wherein the step of removing activated carbonate residue from the reaction components prior to introduction to the extruder is accomplished by heating the oligomer solution and evaporating activated carbonate residue therefrom.

31. The method of claim 1, wherein the reaction components are introduced to the extruder by the use of a side feeder, wherein the side feeder comprises a vent wherein activated carbonate residue is removed from the reaction components by the vent.

32. The method of claim 1, wherein the extruder further comprises a second back vent port located further away from the feed port than the first back vent port wherein the second back vent port is operated at or below atmospheric pressure.

33. The method of claim 32, wherein the restriction of flow from the feed port to the second back vent port is greater than the restriction of flow from the feed port to the polycarbonate exit port.

34. A method for preparing polycarbonate wherein the method comprises the steps of,
(i) forming a reaction mixture comprising at least one dihydroxy compound, an activated carbonate, and a transesterification catalyst,
(ii) heating the reaction mixture at a temperature in a range between 100° C. and 300° C. to provide the reaction components comprising a polycarbonate oligomer, an activated carbonate residue, and a transesterification catalyst,
(iii) removing activated carbonate residue from the reaction components prior to introduction to an extruder,
(iv) heating the reaction components to a temperature greater than the boiling point of the activated carbonate residue, the boiling point being the boiling point of the activated carbonate residue at a flash pressure, the heating being carried out at a feed pressure, the feed pressure being greater than the flash pressure to provide superheated reaction components,
(v) flashing the superheated reaction components to the extruder at the flash pressure through at least one pressure control valve feed port, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and (vi) extruding the reaction components at one or more temperatures in a range between 100° C. and 400° C., wherein during the extrusion of the reaction components activated carbonate residue is removed through the first back vent port, thereby preparing a polycarbonate.

35. The method of claim 34, wherein the extruder further comprises a front vent port located between the feed port and the polycarbonate exit port, wherein during the extrusion of the reaction components, activated carbonate residue is removed through the front vent port.

36. The method of claim 34, wherein the polycarbonate comprises polycarbonate repeat units derived from more than one dihydroxy aromatic compound.

37. The method of claim 34, wherein the activated carbonate residue comprises from 1% to 70% by weight of the total weight of the reaction components introduced to the extruder.

38. The method of claim 34, wherein the activated carbonate residue comprises at least one ester-substituted phenol having structure I,

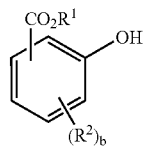

wherein $R^1$ is a $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is an integer 0–4.

39. The method of claim 38, wherein the activated carbonate residue comprises methyl salicylate.

40. The method of claim 38, wherein the reaction components further comprise a solvent selected from the group consisting of a halogenated aromatic solvent, a halogenated aliphatic solvent, a non-halogenated aromatic solvent, and a non-halogenated aliphatic solvent.

41. The method of claim 40, wherein the solvent is ortho-dichlorobenzene.

42. The method of claim 34, wherein the reaction components further comprise a monofunctional phenol chainstopper.

43. The method of claim 42, wherein the chainstopper is p-cumylphenol.

44. The method of claim 34, wherein the extruder has a screw speed, the reaction components being introduced into the extruder at a feed rate, the feed rate and the screw speed having a ratio, the extruder being operated such that the ratio of feed rate in pounds per hour to the screw speed expressed in revolutions per minute falls within a range of from 0.01 to 100.

45. The method of claim 44, wherein the screw speed is in a range between 50 and 1,200 revolutions per minute.

46. The method of claim 34, wherein the extruder is selected from the group consisting of a co-rotating intermeshing double screw extruder, a counter-rotating non-intermeshing double screw extruder; a single screw reciprocating extruder, a single screw non-reciprocating extruder, and a multiple screw extruder.

47. The method of claim 34, wherein the first back vent port is operated at or below atmospheric pressure.

48. The method of claim 34, wherein the first back vent port is operated at a pressure lower than that of the feed pressure.

49. The method of claim 48, wherein the ratio of (feed pressure/the pressure of the first back vent port) is in a range of greater than 0.01 and less than 1.

50. The method of claim 49, wherein the ratio of (feed pressure/the pressure of the first back vent port) is in a range of greater than 0.1 and less than 1.

51. The method of claim 34, further comprising the step of removing a product polycarbonate from the extruder.

52. The method of claim 51, wherein the product polycarbonate is introduced into a second extruder, the second extruder comprising a vent port, and the second extruder being operated at a temperature in a range between 100° C. and 400° C., wherein during the extrusion of the product polycarbonate activated carbonate residue is removed through the vent port.

53. The method of claim 52, wherein the second extruder is selected from the group consisting of a co-rotating intermeshing double screw extruder, a counter-rotating non-intermeshing double screw extruder, a single screw reciprocating extruder, and a single screw non-reciprocating extruder.

54. The method of claim 52, wherein the second extruder has a screw speed, the polycarbonate being introduced into the second extruder at a feed rate, the feed rate and the screw speed having a ratio, the second extruder being operated such that the ratio of feed rate in pounds per hour to the screw speed expressed in revolutions per minute falls within a range of from 0.01 to 100.

55. The method of claim 54, wherein the screw speed of the second extruder is in a range between 50 and 1,200 revolutions per minute.

56. The method of claim 34, wherein the step of removing activated carbonate residue from the reaction components prior to introduction to the extruder is accomplished by the use of a flash tank.

57. The method of claim 34, wherein the step of removing activated carbonate residue from the reaction components prior to introduction to the extruder is accomplished by heating the oligomer solution and evaporating activated carbonate residue therefrom.

58. The method of claim 34, wherein the reaction components are introduced to the extruder by the use of a side feeder, wherein the side feeder comprises a vent wherein activated carbonate residue is removed from the reaction components by the vent.

59. The method of claim 34, wherein the extruder further comprises a second back vent port located further away from the feed port than the first back vent port wherein the second back vent port is operated at or below atmospheric pressure.

60. A molded article comprising polycarbonate formed by the steps of,
- (a) preparing a polycarbonate by,
  - (i) introducing to an extruder through a feed port a plurality of reaction components comprising a polycarbonate oligomer, an activated carbonate residue, and a transesterification catalyst, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and
  - (ii) extruding the reaction components at one or more temperatures in a range between 100° C. and 400° C., wherein during the extrusion of the reaction components, activated carbonate residue is removed through the first back vent port, thereby forming a polycarbonate, and
- (b) forming a molded article from the polycarbonate.

61. A method for making a molded article formed from polycarbonate produced by the method comprising the steps of:
- (a) preparing a polycarbonate by,
  - (i) introducing to an extruder through a feed port a plurality of reaction components comprising a polycarbonate oligomer, an activated carbonate residue, and a transesterification catalyst, wherein the extruder comprises the feed port, a first back vent port, and a polycarbonate exit port, wherein the feed port is located between the first back vent port and the polycarbonate exit port, and wherein the resistance to flow of the reaction components from the feed port to the first back vent port is less than or equal to the resistance to flow of the reaction components from the feed port to the polycarbonate exit port, and
  - (ii) extruding the reaction components at one or more temperatures in a range between 100° C. and 400° C., wherein during the extrusion of the reaction components, activated carbonate residue is removed through the first back vent port, thereby forming a polycarbonate, and
- (b) forming a molded article from the polycarbonate.

* * * * *